(12) United States Patent
Nasu

(10) Patent No.: US 10,908,973 B2
(45) Date of Patent: Feb. 2, 2021

(54) INFORMATION PROCESSING DEVICE

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/615,408

(22) PCT Filed: Jul. 31, 2017

(86) PCT No.: PCT/JP2017/027721
§ 371 (c)(1),
(2) Date: Nov. 21, 2019

(87) PCT Pub. No.: WO2019/026136
PCT Pub. Date: Feb. 7, 2019

(65) Prior Publication Data
US 2020/0379825 A1    Dec. 3, 2020

(51) Int. Cl.
*G06F 9/54* (2006.01)

(52) U.S. Cl.
CPC .................... *G06F 9/542* (2013.01)

(58) Field of Classification Search
CPC ......... G06F 9/466; G06F 9/4843; G06F 9/542
USPC .................. 718/100, 101; 719/318
See application file for complete search history.

(56) References Cited

U.S. PATENT DOCUMENTS

| | | | | |
|---|---|---|---|---|
| 6,708,226 B2* | 3/2004 | Peters | .................... | G06F 9/5027 705/34 |
| 6,826,673 B2* | 11/2004 | Toyoyama | ......... | H04Q 11/0478 700/3 |
| 7,765,549 B1* | 7/2010 | Lauer | .................... | G06F 9/5005 718/101 |
| 2002/0029331 A1 | 3/2002 | Toyoyama et al. | | |
| 2006/0259731 A1 | 11/2006 | Oshins et al. | | |
| 2011/0066782 A1 | 3/2011 | Oshins et al. | | |
| 2013/0332925 A1 | 12/2013 | Motai et al. | | |

(Continued)

FOREIGN PATENT DOCUMENTS

| JP | 2000-078236 A | 3/2000 |
|---|---|---|
| JP | 2000-232477 A | 8/2000 |

(Continued)

OTHER PUBLICATIONS

International Search Report and Written Opinion dated Aug. 29, 2017 for PPCT/JP2017/027721 filed on Jul. 31, 2017, 9 pages including English Translation of the International Search Report.

(Continued)

*Primary Examiner* — Andy Ho
(74) *Attorney, Agent, or Firm* — Xsensus LLP

(57) ABSTRACT

An information processing device includes: a first processing unit that processes data on a real-time operating system that executes processing within a specified time; a second processing unit that processes data on a non-real-time operating system; and a transmission unit that adjusts a data amount of transmission data to be transmitted at a time on the basis of an accumulation amount of transmission data transmitted between the first processing unit and the second processing unit, and transmits the transmission data.

8 Claims, 9 Drawing Sheets

(56) References Cited

U.S. PATENT DOCUMENTS

2016/0041883 A1    2/2016  Motai et al.
2017/0177431 A1    6/2017  Motai et al.

FOREIGN PATENT DOCUMENTS

| JP | 2001-282558 A | 10/2001 |
| JP | 2002-077297 A | 3/2002 |
| JP | 2002-140201 A | 5/2002 |
| JP | 2006-318441 A | 11/2006 |
| JP | 2013-125345 A | 6/2013 |
| JP | 2013-257695 A | 12/2013 |

OTHER PUBLICATIONS

Notification of Reasons for Refusal received for Japanese Patent Application No. 2018-513884, dated Apr. 17, 2018, 4 pages including English Translation.

Decision to Refusal received for Japanese Patent Application No. 2018-513884, dated Sep. 4, 2018, 5 pages including English Translation.

Office Action received for Taiwanese Application No. 107119662 dated Apr. 12, 2019, 24 pages including English Translation.

Decision to Grant a Patent received for Japanese Patent Application No. 2018-513884, dated Mar. 5, 2019, 5 pages.

\* cited by examiner

INFORMATION PROCESSING DEVICE

CROSS-REFERENCE TO RELATED APPLICATIONS

The present application is based on PCT filing PCT/JP2017/027721, filed Jul. 31, 2017, the entire contents of which are incorporated herein by reference.

FIELD

The present invention relates to an information processing device including a plurality of operating systems (OSs), and an information processing method.

BACKGROUND

A real-time operating system (hereinafter referred to as a real-time OS) is an OS capable of executing processing within a specified time, and is mainly used for executing various processes that need to meet time constraints. Patent Literature 1 teaches a computer system including a plurality of OSs including a real-time OS. Mounting a real-time OS and a non-real-time OS on one information processing device allows the device to have both real-time characteristics and versatility.

CITATION LIST

Patent Literature

Patent Literature 1: Japanese Patent Application Laid-open No 2013-257695

SUMMARY

Technical Problem

In execution of a series of processes across a plurality of OSs using the technology taught in Patent Literature 1, however, the waiting time until a process is started, the time required for processing, and the like vary depending on the OS, and there have been problems in that accumulation of data between the OSs, an input queue of data, and the like occur, which lowers the processing efficiency of the entire system.

The present invention has been made in view of the above, and an object thereof is to provide an information processing device capable of improving the efficiency of processing a series of processes across a plurality of OSs by efficiently performing data transmission between the OSs.

Solution to Problem

In order to solve the above problems and achieve the object, an information processing device according to the present invention comprises: a first processing unit to process data on a real-time operating system that executes processing within a specified time; a second processing unit to process the data on a non-real-time operating system; and a transmission unit to adjust a data amount of transmission data to be transmitted at a time on the basis of an accumulation amount of transmission data transmitted between the first processing unit and the second processing unit, and transmit the transmission data.

Advantageous Effects of Invention

An information processing device according to the present invention produces an effect of improving the efficiency of processing a series of processes across a plurality of OSs.

DESCRIPTION OF EMBODIMENTS

An information processing device and an information processing method according to an embodiment of the present invention will be described in detail below with reference to the drawings. Note that the present invention is not limited to the embodiment.

Embodiment

Figure 1:
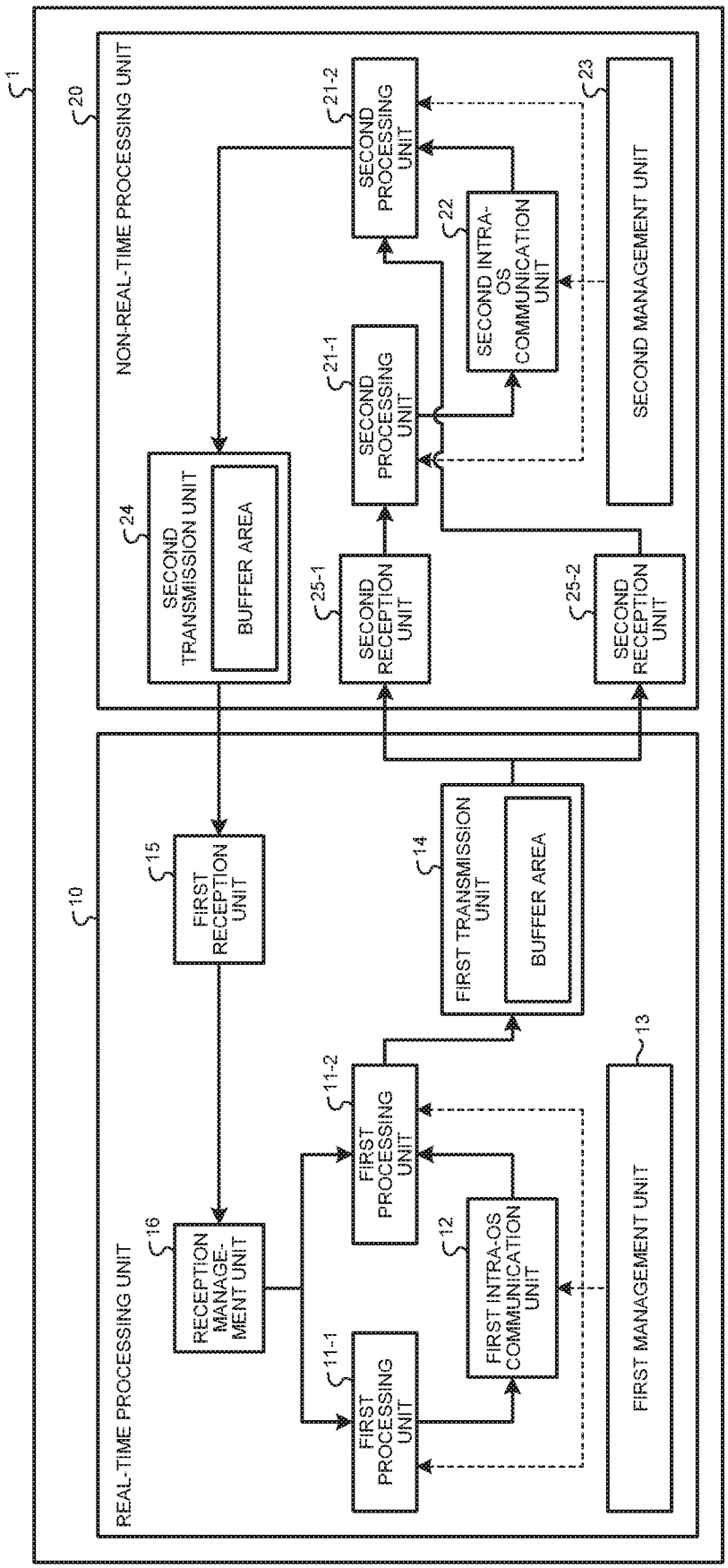
FIG. 1 is a diagram illustrating a functional configuration of an information processing device according to an embodiment of the present invention.

FIG. 1 is a diagram illustrating a functional configuration of an information processing device 1 according to an embodiment of the present invention. The information processing device 1 is a data processing device that processes industrial data relating to operation of manufacturing equipment in production sites. Industrial data are any data generated in production sites, such as data indicating the states of production facilities, such as temperatures, voltages, and currents in respective components of production facilities, distances between parts in production facilities, speeds at which driving units included in production facilities are operated, operating times of production facilities, and the number of times of error in production facilities, data indicating the states, the number, and the like of workers carrying out preparation work for operation of production facilities, and data indicating production plans including planned production quantities. In addition, industry used in the present embodiment is industry in the broad sense, including manufacture, agriculture, fisheries industry, etc. In addition, industrial data are data handled in the industries, and refer to, in the manufacture field, data handled in factories, infrastructure management, warehouses, buildings, offices, and home, for example. Production sites refer to sites where devices in respective industries are installed accordingly, and are not limited to production sites in factories.

The information processing device 1 performs data processing such as collection, processing, diagnosis, notification, and the like of industrial data. The information processing device 1 includes a real-time OS and a non-real-time OS. The information processing device 1 has functions of executing a series of processes across the real-time OS and the non-real-time OS, and transmission and reception of data between the real-time OS and the non-real-time OS thus occur.

Note that the real-time OS is capable of processing data within a specified processing time, and is thus mainly used for executing processes that need to be processed with priority. In the non-real-time OS, the processing time cannot be specified, unlike the real-time OS. Waiting time may thus occur until a process is started. The non-real-time OS is, however, excellent in scalability. Because there has already been a variety of application software that works on non-real-time OSs, use of such existing application software can reduce the labor for development of functions to be executed by the information processing device 1. In addition, the non-real-time OS is mainly used for executing complicated analytical processes and the like.

In execution of a series of processes across the real-time OS and the non-real-time OS, the waiting time until a process is started, the processing time, and the like may vary depending on the OS. In this case, transmission data transmitted between the OSs may be accumulated as processing cannot be started at the receiving side, or a waiting time may occur as data are not transmitted although the receiving side is in a state in which processing can be started. In addition, in a process requiring a plurality of input data, a waiting time may occur or data may be unable to be processed and discarded if some data are not transmitted. Thus, the information processing device 1 has functions for increasing the efficiency of subsequent processes by adjusting timings at which transmission data are transmitted to efficiently execute a series of processes across the real-time OS and the non-real-time OS and adjusting the transmission data themselves.

The information processing device 1 includes a real-time processing unit 10 that operates on the real-time OS, and a non-real-time processing unit 20 that operates on the non-real-time OS. The real-time processing unit 10 includes a first processing unit 11-1 and a first processing unit 11-2, a first intra-OS communication unit 12, a first management unit 13, a first transmission unit 14, a first reception unit 15, and a reception management unit 16. The non-real-time processing unit 20 includes a second processing unit 21-1 and a second processing unit 21-2, a second intra-OS communication unit 22, a second management unit 23, a second transmission unit 24, and a second reception unit 25-1 and a second reception unit 25-2.

In the description below, the first processing unit 11-1 and the first processing unit 11-2 will be collectively referred to as first processing units 11 when the first processing units 11 need not be particularly distinguished from each other. In a similar manner, the second processing unit 21-1 and the second processing unit 21-2 will be collectively referred to as second processing units 21 when the second processing units 21 need not be particularly distinguished from each other, and the second reception unit 25-1 and the second reception unit 25-2 will be collectively referred to as second reception units 25 when the second reception units 25 need not be particularly distinguished from each other.

The real-time processing unit 10 includes two first processing units 11. The number of first processing units 11 included in the real-time processing unit 10 is not limited to that in the example of FIG. 1, and may be one or three or more. The first processing units 11 are each a functional unit that executes data processing of input data on the real-time OS. The first processing units 11 have a function of collecting industrial data to be processed from external devices, which are not illustrated, for example. In addition, the first processing units 11 may perform processing, analysis, diagnosis, and the like of collected data. Examples of processing performed by the first processing units 11 include scaling and rounding of collected data. The first processing units 11 are each implemented by application software that independently operates on the real-time OS. The first intra-OS communication unit 12 relays communication between first processing units 11. As a result, output data from the first processing unit 11-1 become input data to the first processing unit 11-2.

The first management unit 13 controls the first processing units 11 and the first intra-OS communication unit 12, and manages execution sequences and operation timings of the first processing units 11. The first transmission unit 14 is a transmission unit that transmits transmission data from the real-time OS to the non-real-time OS. The first transmission unit 14 transmits transmission data input from the first processing units 11 to either of the second reception units 25. The first transmission unit 14 has a buffer area for temporarily storing transmission data, and adjusts the amount of transmission data to be transmitted at a time and the timing at which transmission data are to be transmitted on the basis of an accumulation amount that is the amount of transmission data stored in the buffer area. The first transmission unit 14 checks the accumulation amount of transmission data for each second reception unit 25 that is a destination of the transmission data on the basis of the destination information added to the transmission data, and adjusts the amount of data to be transmitted from the real-time processing unit 10 to the non-real-time processing unit 20. Details of the configuration of the first transmission unit 14 will be described later.

While the accumulation amount refers to the amount of transmission data stored in the buffer area in the description above, the present invention is not limited thereto. Instead of being directly based on the amount of transmission data stored in the buffer area, the accumulation amount may alternatively be an amount estimated on the basis of a production plan of a day in a production facility (operation states in a production facility), for example, such as the amounts of data processed by the first processing units 11 and time zones during which data are processed by the first processing units. In addition, while the buffer area for checking the accumulation amount is provided in the first transmission unit 14 is the description above, the buffer area may not be provided in the first transmission unit 14 as long as the advantageous effects of the present invention are produced. Other embodiments of the accumulation amount and other embodiments of the buffer area are also applicable to those in the non-real-time processing unit 20.

The first reception unit 15 has a function of receiving transmission data transmitted between the OSs. The first reception unit 15 is capable of receiving transmission data transmitted from the second transmission unit 24 by using a storage area for data reception into which data can be written from the non-real-time processing unit 20, for example. The number of first reception units 15 is fixed, and does not increase or decrease while the real-time processing unit 10 is running. Thus, resources such as storage areas for data reception can be reserved. On the real-time OS, a large increase or decrease in the amount of use of resources such as storage areas makes it difficult to guarantee a specified processing time, and is therefore undesirable. A fixed number of first reception units 15 improves the stability of operation. In the present embodiment, the real-time processing unit 10 includes one first reception unit 15, which inputs received transmission data to the reception management unit 16. The reception management unit 16 has a function of assigning received transmission data to one of the first processing units 11 on the basis of destination information added to the received transmission data.

The non-real-time processing unit 20 includes two second processing units 21. The number of second processing units 21 included in the non-real-time processing unit 20 is not limited to that in the example illustrated in FIG. 1, and may be one or three or more. The second processing units 21 are each a functional unit that executes data processing of input data on the non-real-time OS. The second processing units 21 each performs at least one of processing and diagnosis of input data, for example. The second processing units 21 preferably execute processing that is more complicated than data processing executed by the first processing units 11 and that does not require real-time characteristics. Example of processing performed by the second processing units 21 include noise processing, variable analysis, fast Fourier transform (FFT), and data processing using deep learning. In addition, the functions of the second processing units 21 are each implemented by application software that operates on the non-real-time OS. The non-real-time OS is excellent in versatility, and various application software can be diverted from other uses to be operated on the non-real-time OS.

The second intra-OS communication unit 22 relays communication between the second processing units 21. The second intra-OS communication unit 22 relays communication from the second processing unit 21-1 to the second processing unit 21-2, for example. As a result, output data from the second processing unit 21-1 become input data to the second processing unit 21-2. The second management unit 23 controls the second processing units 21 and the second intra-OS communication unit 22, and manages execution sequences and operation timings of the second processing units 21.

The second transmission unit 24 is a transmission unit that transmits transmission data from the non-real-time OS to the real-time OS. The second transmission unit 24 transmits transmission data input from the second processing units 21 to the first reception unit 15. The second transmission unit 24 has a buffer area for temporarily storing transmission data, and has functions of adjusting the amount of data to be transmitted at a time and the timing at which data are to be transmitted, and efficiently transmitting transmission data between the OSs on the basis of an accumulation amount that is the amount of transmission data stored in the buffer area. The second transmission unit 24 adjusts the amount of transmission data to be transmitted at a time from the non-real-time processing unit 20 to the real-time processing unit 10. In the present embodiment, the second transmission unit 24 transmits all transmission data to the first reception unit 15 because the number of first reception units 15 to which the second transmission unit 24 transmits transmission data is one; in a case where a plurality of first reception units 15 are present, however, the second transmission unit 24 checks the accumulation amount of transmission data in the buffer area for each of the first reception units 15 that are destinations of transmission data on the basis of destination information added to the transmission data, and adjusts the amount of data to be transmitted.

The non-real-time processing unit 20 includes a plurality of second reception units 25. The second reception units 25 are reception units that receive transmission data transmitted from the real-time processing unit 10. In the example illustrated in FIG. 1, the number of second reception units 25 is the same as the number of second processing units 21, and the second reception units 25 are associated with the respective second processing units 21. The number of second reception units 25, however, is not limited to that in the example illustrated in FIG. 1, and may be one or more than one. In addition, the number of second reception units 25 need not be the same as the number of second processing units 21. The second reception units 25 are capable of receiving transmission data transmitted between the OSs by using storage areas into which data can be written from the real-time processing unit 10, for example. The number of second reception units 25 may change while the information processing device 1 is running.

Because the non-real-time processing unit 20 does not execute processing whose processing time is specified, unlike the real-time processing unit 10, the application software for implementing the functions of the second processing units 21 has functions of generating the second reception units 25 for receiving data input to the second processing units 21. Thus, each time a second processing unit 21 is started, a second reception unit 25 that is associated with the started second processing unit 21 may be generated.

Figure 2:
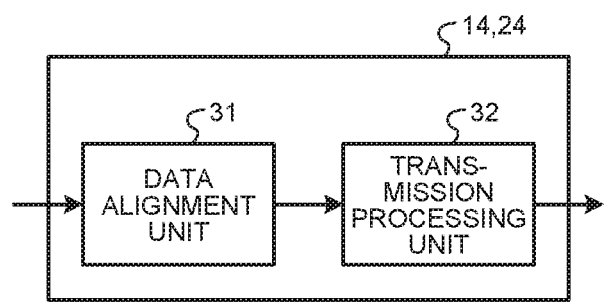
FIG. 2 is a diagram illustrating a detailed configuration of a first transmission unit and a second transmission unit illustrated in FIG. 1.

FIG. 2 is a diagram illustrating a detailed configuration of the first transmission unit 14 and the second transmission unit 24 illustrated in FIG. 1. The first transmission unit 14 includes a data alignment unit 31 and a transmission processing unit 32. The second transmission unit 24 has a configuration similar to that of the first transmission unit 14.

The data alignment unit 31 aligns transmission data in a case where there are no corresponding data among a plurality of kinds of transmission data that are input. The kinds of transmission data vary depending on the attribute of data such as temperature data and speed data. Corresponding data refer to data handled as one record by a subsequent second processing unit 21, such as data with the same time of occurrence or data that are input at the same time to the data alignment unit 31. The time of data with the same time includes a certain range of time, which is a range set in advance or afterwards. In a case where time information such as a time stamp is added to transmission data that are input, the data alignment unit 31 can determine corresponding data on the basis of the time stamp. Alternatively, in a case where the time of input to the data alignment unit 31 is used, the data alignment unit 31 can determine, without using time information, that no corresponding data are present if data input at the same time are missing. Examples of the method by which the data alignment unit 31 aligns transmission data include interpolation to compensate for missing data, discarding transmission data, and time shifting of transmission data.

Figure 3:
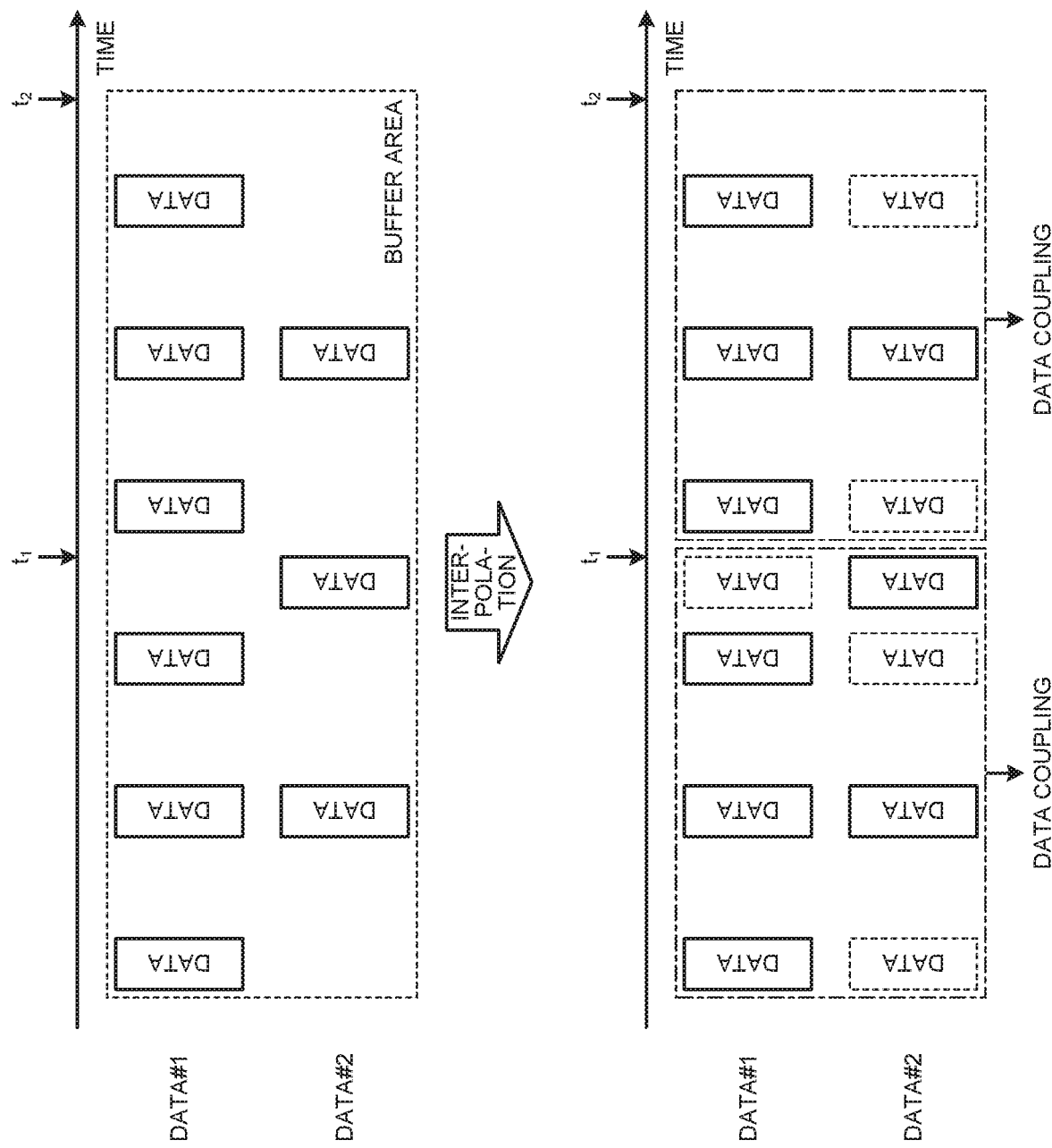
FIG. 3 is a diagram illustrating a first example of an alignment process performed by a data alignment unit illustrated in FIG. 2.

FIG. 3 is a diagram illustrating a first example of an alignment process performed by the data alignment unit 31 illustrated in FIG. 2. The first example is a process of compensating for missing data by interpolation. In a case where no corresponding transmission data are present among a plurality of kinds of transmission data, the data alignment unit 31 can align the transmission data by performing interpolation to compensate for missing data. Rectangles with broken lines in FIG. 3 represent interpolated data. The interpolation is a process of copying transmission data previous to missing data, and inserting the copied transmission data to the missing parts, for example. Alternatively, the interpolation may be performed by using zero-order interpolation, linear interpolation, or the like for estimating and generating missing data by using transmission data previous to the missing data and data generated at time after that of the missing data. In zero-order interpolation, linear interpolation, and the like, data generated at time after that of missing data need to be used, which results in a long processing time. Thus, in a case where streaming in which weight is given to the real-time characteristics is to be performed, use of the method of copying previous transmission data is preferable.

Figure 4:
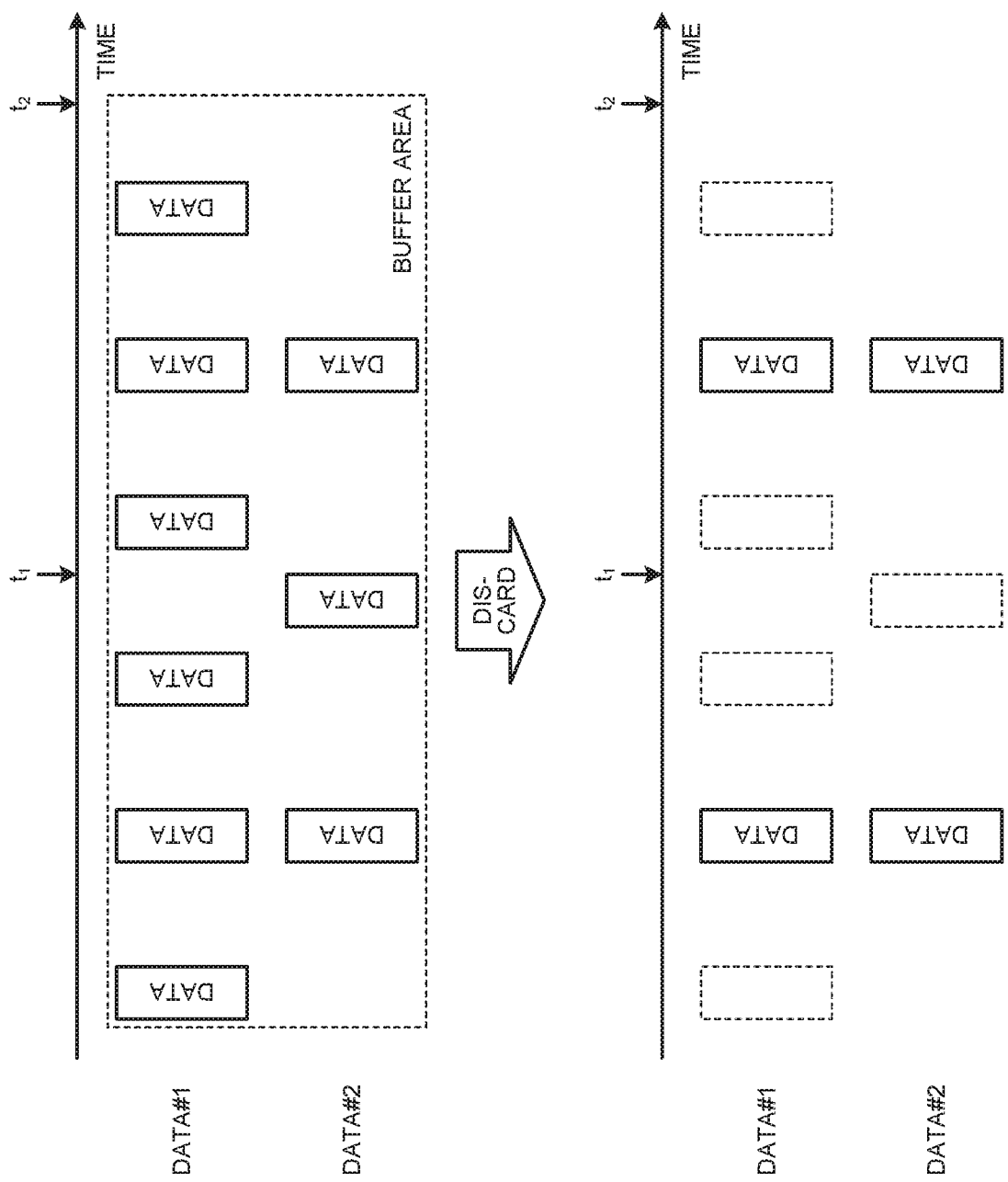
FIG. 4 is a diagram illustrating a second example of the alignment process performed by the data alignment unit illustrated in FIG. 2.

FIG. 4 is a diagram illustrating a second example of the alignment process performed by the data alignment unit 31 illustrated in FIG. 2. The second example is a process of discarding transmission data so that only data whose corresponding transmission data are present remain. In a case where a first processing unit 11 that performs data collection fails in collecting data, for example, some kind of transmission data may be missing at the timing when the data collection fails. In a case where no corresponding transmission data are present among a plurality of kinds of transmission data, the data alignment unit 31 can align the transmission data by performing a process of discarding the transmission data so that associated transmission data remain. Rectangles with broken lines in FIG. 4 represent discarded data.

Figure 5:
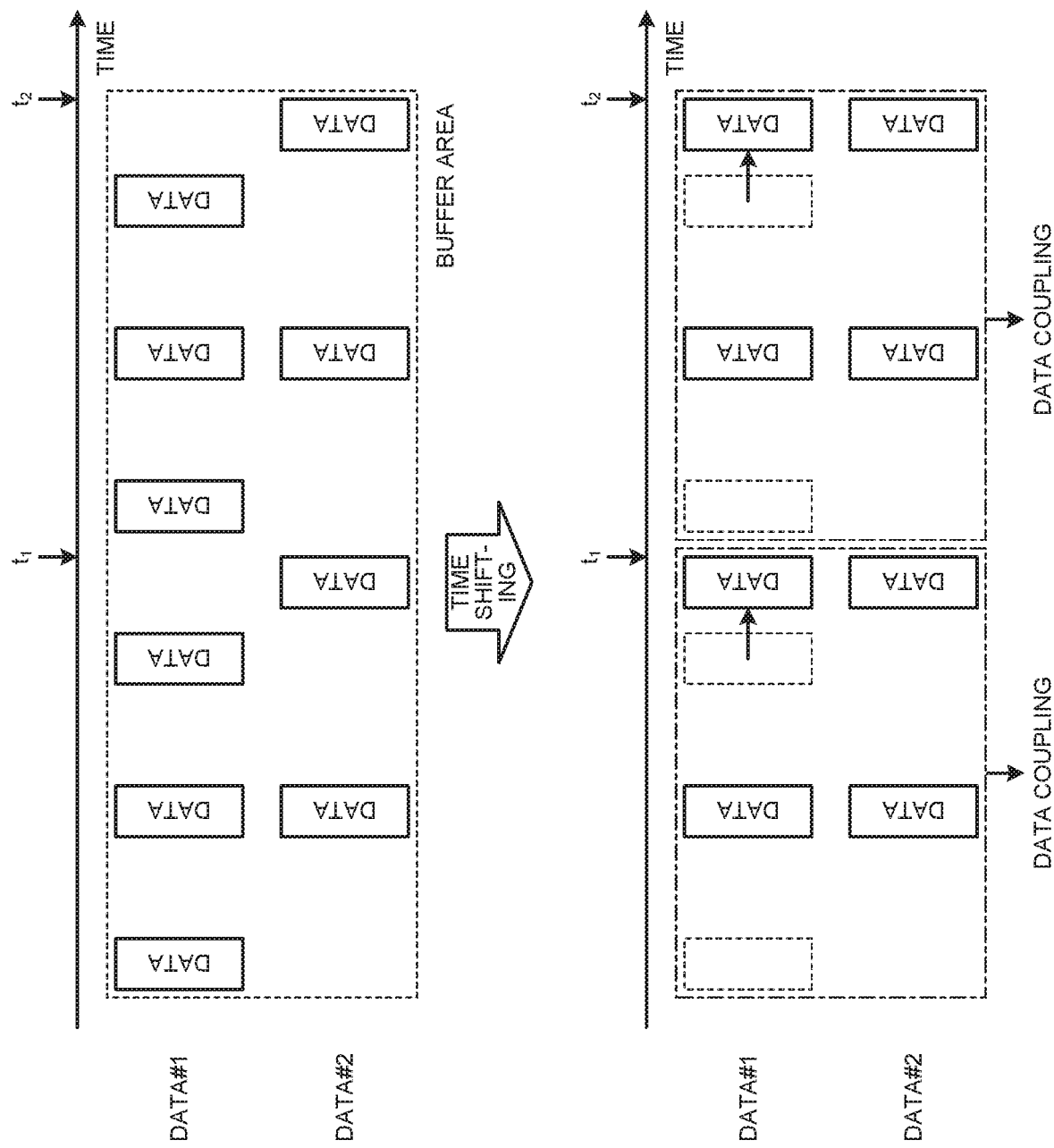
FIG. 5 is a diagram illustrating a third example of the alignment process performed by the data alignment unit illustrated in FIG. 2.

FIG. 5 is a diagram illustrating a third example of the alignment process performed by the data alignment unit 31 illustrated in FIG. 2. The third example is a process of associating transmission data by time shifting. In a case where no corresponding data are present among a plurality of kinds of transmission data, the data alignment unit 31 can align the transmission data by performing time shifting for apparently shifting the time at which transmission data occur or the time at which transmission data are input to the data alignment unit 31, so that transmission data are associated. Note that, in the example of FIG. 5, discarding of transmission data is also performed with the time shifting.

Interpolation of transmission data is advantageous in that transmission data are not reduced; however, the data amount increases and the traffic between the OSs thus increases. Discarding transmission data is advantageous in that the data amount decreases and the traffic between the OSs is thus reduced; however, there may be cases where no data at all are transmitted when no associated transmission data are present. In addition, the data amount of transmission data may greatly decrease when the period during which transmission data are associated is long. The data alignment unit 31 may use any one of the methods in view of the characteristics of the respective methods, or may combine interpolation, discarding, and time shifting of transmission data. For example, the data alignment unit 31 may combine time shifting and discarding as illustrated in FIG. 5, or may combine discarding and interpolation. Combination of a plurality of methods may compensate for disadvantages of the respective methods.

The transmission processing unit 32 adjusts the amount of transmission data to be transmitted at a time on the basis of the accumulation amount of the transmission data aligned by the data alignment unit 31. Specifically, the transmission processing unit 32 switches, on the basis of the accumulation amount, between batch processing of transmitting a plurality of transmission data together and serial processing of transmitting transmission data individually. Details of the method for switching between batch processing and serial processing by the transmission processing unit 32 will be explained below with reference to three examples.

Figure 6:
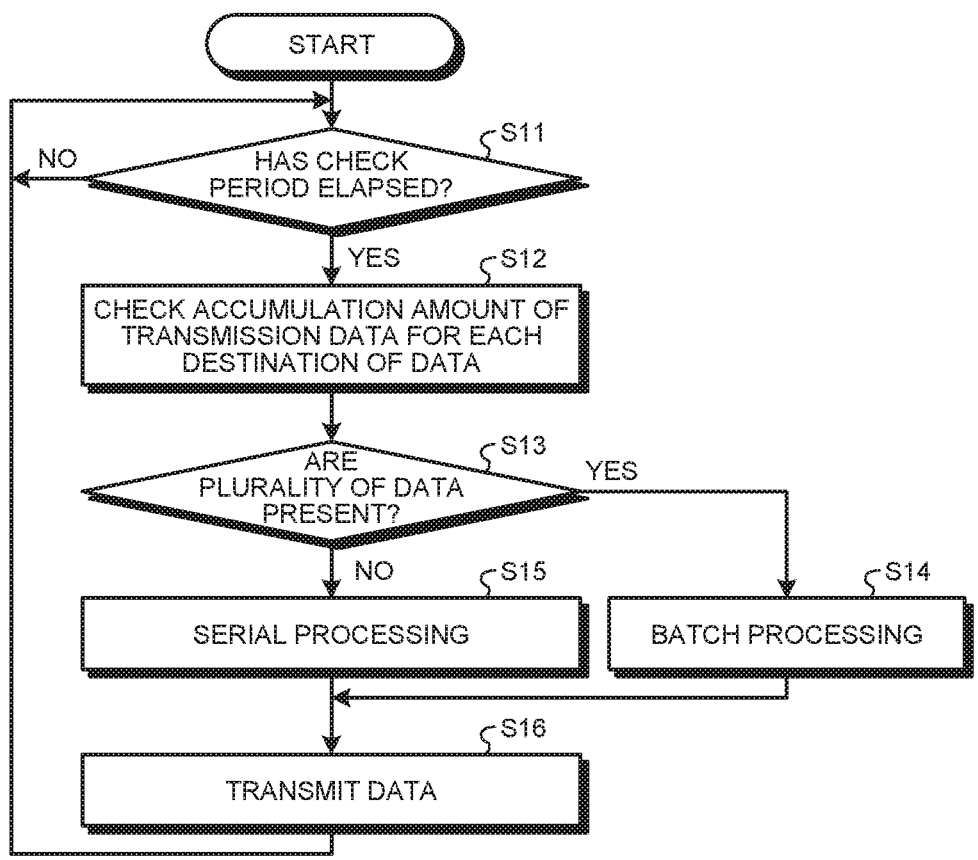
FIG. 6 is a flowchart illustrating a first example of operation of a transmission processing unit illustrated in FIG. 2.

FIG. 6 is a flowchart illustrating a first example of the operation of the transmission processing unit 32 illustrated in FIG. 2. The transmission processing unit 32 has a function of measuring a first elapsed time, which is time that has elapsed from when the accumulation amount was previously checked, by using a timer or the like included in the information processing device 1. The transmission processing unit 32 then determines whether or not a predetermined check period, which is a period for checking the accumulation amount of transmission data by the transmission processing unit 32, has elapsed by using a first elapsed time (step S11). If the check period has not elapsed, that is, if the first elapsed time is shorter than the check period (step S11: No), the transmission processing unit 32 repeats the process of step S11 until the check period elapses. If the check period has elapsed, that is, the first elapsed time has become equal to or longer than the check period (step S11: Yes), the transmission processing unit 32 checks the accumulation amount of transmission data for each destination of data (step S12).

The transmission processing unit 32 determines whether or not a plurality of accumulated transmission data are present on the basis of the checked accumulation amount (step S13). The transmission processing unit 32 determines whether or not a plurality of data are present on the basis of the number of data regardless of the kinds of transmission data. If a plurality of data are present (step S13: Yes), the transmission processing unit 32 performs batch processing (step S14). If a plurality of data are not present (step S13: No), the transmission processing unit 32 performs serial processing (step S15). Specifically, when batch processing is performed, the transmission processing unit 32 puts a plurality of accumulated transmission data together, and adds a header including information indicating the number of transmission data put together to the transmission data. This enables the number of transmission data put together to be obtained at the receiving side, and a plurality of transmission data put together can be received by one reception process. When serial processing is performed, the transmission processing unit 32 adds a header to each of the accumulated transmission data. Thereafter, the transmission processing unit 32 transmits data resulting from the batch processing or the serial processing to the second reception units 25 of the non-real-time processing unit 20 (step S16). The transmission processing unit 32 returns to the process in step S11. While the transmission processing unit 32 puts together a plurality of transmission data obtained by data coupling as illustrated in FIG. 3, etc., the present invention is not limited thereto, and transmission data may be put together in unit of a plurality of transmission data obtained by data coupling.

Through the operation described above, the transmission processing unit 32 checks the accumulation amount of transmission data at predetermined time intervals, and switches, on the basis of the checked accumulation amount, between batch processing of transmitting a plurality of transmission data together and serial processing of transmitting transmission data individually.

For example, in the example of FIG. 3, assume that the check period elapses at time $t_1$ and time $t_2$. In this case, data within a frame of alternate long and short dash lines are coupled and subjected to batch processing. Note that the transmission processing unit 32 couples data for each destination of data, and data #1 and data #2 illustrated in FIG. 3 are coupled separately when the destinations of data #1 and data #2 are different from each other. In addition, in the example of FIG. 4, when the destination of data #1 is different from that of data #2, the transmission processing unit 32 performs serial processing because only one data #1 and one data #2 are accumulated at time $t_1$ and time $t_2$.

While the transmission processing unit 32 checks the accumulation amount of transmission data at predetermined time intervals and switches between batch processing and serial processing, the present embodiment is not limited thereto, and the accumulation amount of transmission data in the buffer area may always be checked, and batch processing may be performed when transmission data have accumulated in the buffer area and serial processing may otherwise be performed.

Figure 7:
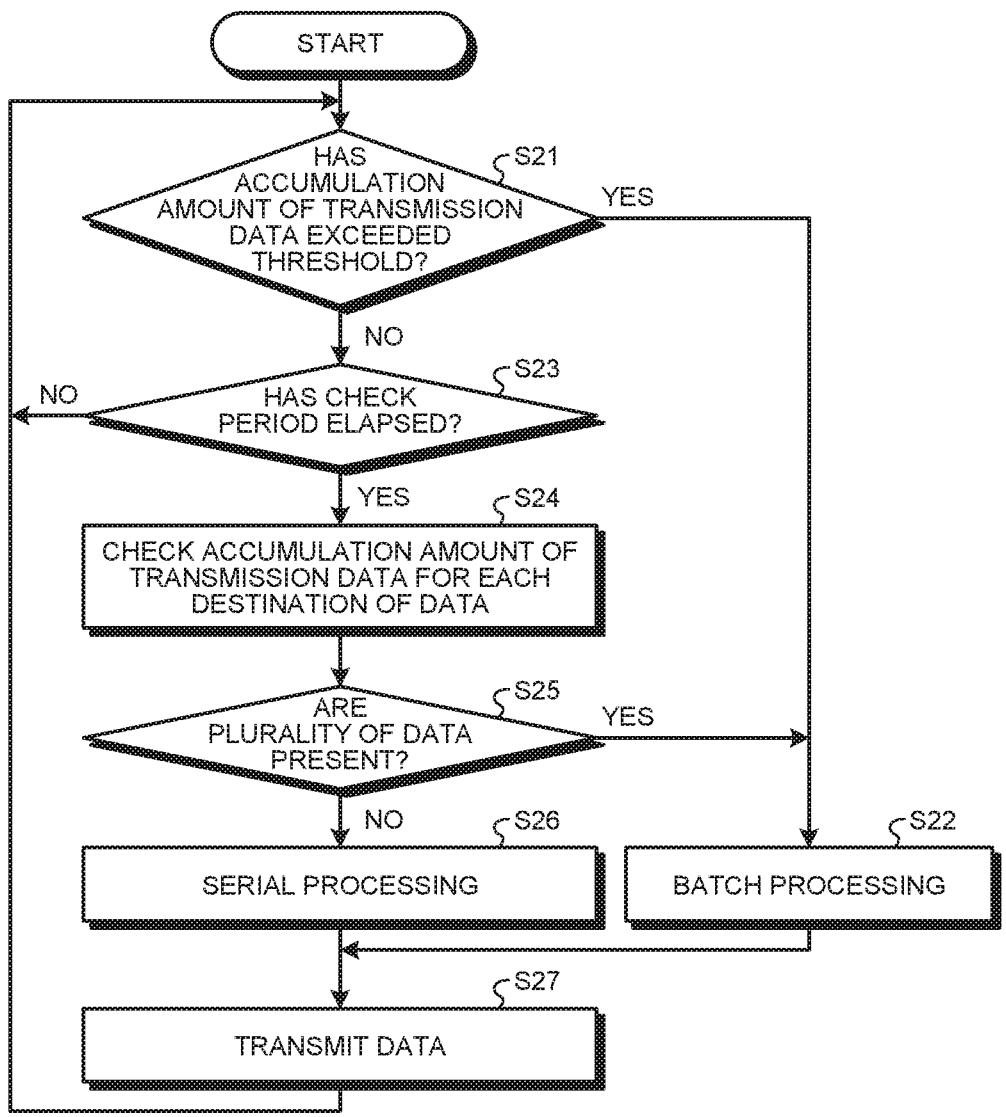
FIG. 7 is a flowchart illustrating a second example of the operation of the transmission processing unit illustrated in FIG. 2.

FIG. 7 is a flowchart illustrating a second example of the operation of the transmission processing unit 32 illustrated in FIG. 2. The transmission processing unit 32 determines whether or not the accumulation amount of transmission data has exceeded a predetermined threshold (step S21). The threshold used for the accumulation amount by the transmission processing unit 32 can be an amount of transmission data, which are received from the first transmission unit 14 by the second reception units 25, that can be processed during one check period, for example. If the accumulation amount of transmission data has exceeded the threshold (step S21: Yes), the transmission processing unit 32 performs batch processing of an amount of transmission data within the threshold among the accumulated transmission data (step S22). If the accumulation amount transmission data has not exceeded the threshold (step S21: No), the transmission processing unit 32 determines whether or not the check period has elapsed (step S23). If the check period has not elapsed (step S23: No), the transmission processing unit 32 returns to the process in step S21. If the check period has elapsed (step S23: Yes), the transmission processing unit 32 checks the accumulation amount of transmission data for each destination of data (step S24).

The transmission processing unit 32 determines whether or not a plurality of accumulated transmission data are present on the basis of the checked accumulation amount (step S25). If a plurality of data are present (step S25: Yes), the transmission processing unit 32 performs batch processing (step S22). If a plurality of data are not present (step S25: No), the transmission processing unit 32 performs serial processing (step S26). The transmission processing unit 32 transmits data resulting from the batch processing or the serial processing (step S27). Returning back to step S21, the transmission processing unit 32 determines whether or not the accumulation amount of transmission data has exceeded the predetermined threshold.

Through the operation described above, when the accumulation amount of transmission data has exceeded the predetermined threshold, the amount of transmission data within the threshold are subjected to batch processing, and transmission data in excess of the threshold are subjected to batch processing or serial processing separately from the amount of transmission data within the threshold. In this manner, the amount of transmission data transmitted at a time between the first processing units 11 and the second processing units 21 across the OSs is adjusted on the basis of the accumulation amount of transmission data.

Figure 8:
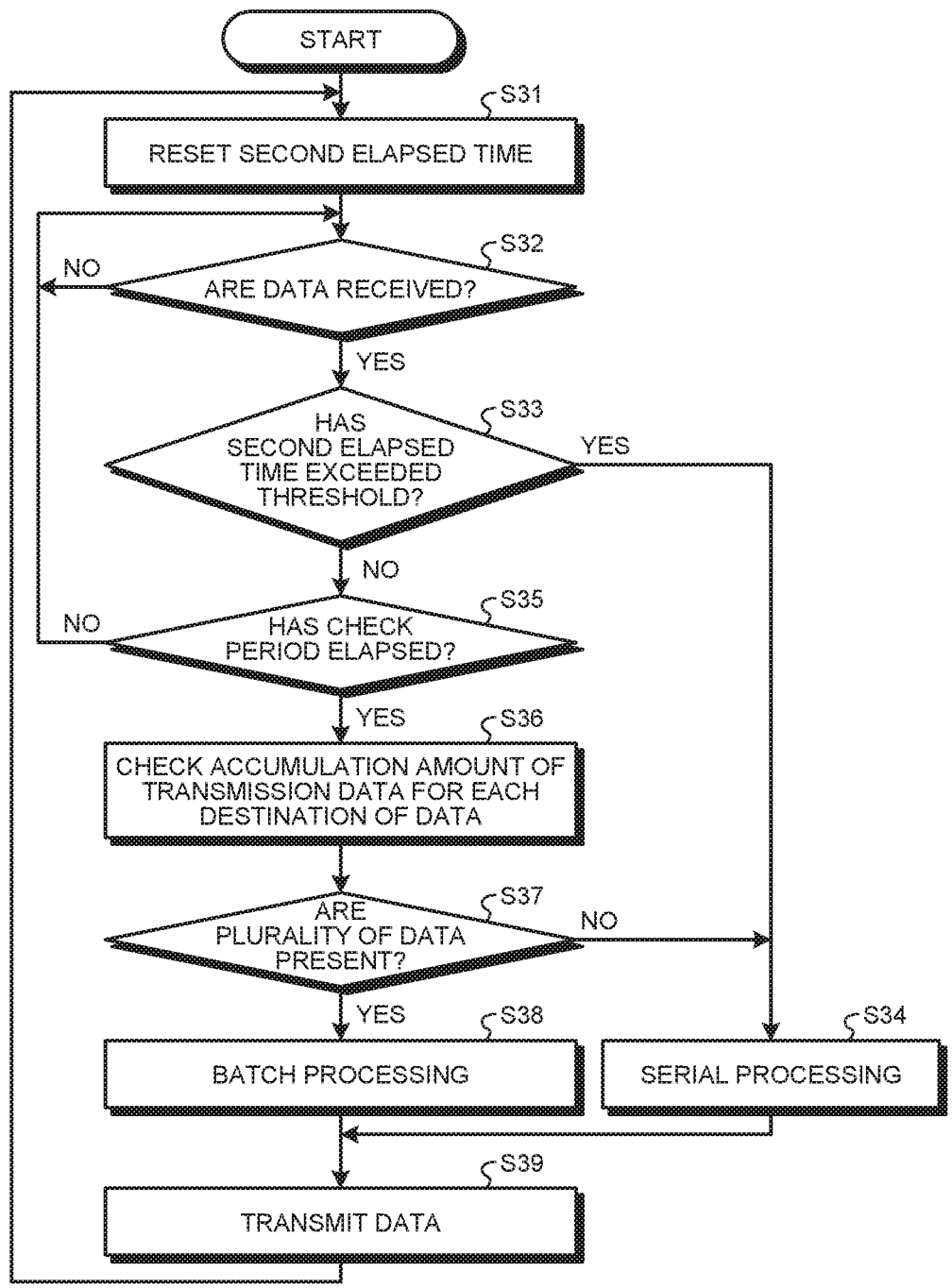
FIG. 8 is a flowchart illustrating a third example of the operation of the transmission processing unit illustrated in FIG. 2.

FIG. 8 is flowchart illustrating a third example of the operation of the transmission processing unit 32 illustrated in FIG. 2. The transmission processing unit 32 has a function of measuring a second elapsed time, which is time that has elapsed from when transmission data were previously transmitted, and first resets the second elapsed time (step S31). The transmission processing unit 32 measures the second elapsed time separately from the first elapsed time by using a timer or the like included in the information processing device 1. The transmission processing unit 32 determines whether or not data re received from the data alignment unit 31 (step S32).

If no data are received (step S32: No), the transmission processing unit 32 repeats the process in step S32. If data are received (step S32: Yes), the transmission processing unit 32 determines whether or not the measured second elapsed time has exceeded a predetermined threshold (step S33). If the second elapsed time has exceeded the threshold (step S33: Yes), the transmission processing unit 32 performs serial processing (step S34). If the second elapsed time has not exceeded the threshold (step S33: No), the transmission processing unit 32 determines whether or not the check period has elapsed on the basis of the first elapsed time (step S35). If the check period has not elapsed (step S35: No), the transmission processing unit 32 returns to the process in step S32. If the check period has elapsed (step S35: Yes), the transmission processing unit 32 checks the accumulation amount of transmission data for each destination of data (step S36).

The transmission processing unit 32 determines whether or not a plurality of data are present on the basis of the checked accumulation amount (step S37). If a plurality of data are present (step S37: Yes), the transmission processing unit 32 performs batch processing (step S38). If a plurality of data are not present (step S37: No), the transmission processing unit 32 performs serial processing (step S34). The transmission processing unit 32 transmits data resulting from the batch processing or the serial processing (step S39). The transmission processing unit 32 returns to the process in step S31.

Through the operation described above, the transmission processing unit 32 switches between batch processing and serial processing on the basis of the second elapsed time. Specifically, when transmission data occur, the transmission processing unit 32 performs serial processing if the second elapsed time has exceeded time that is a predetermined threshold.

Note that the three examples of the operation of the transmission processing unit 32 explained above with reference to FIGS. 6 to 8 can be used in combination. For example, the operation of performing batch processing when the accumulation amount of transmission data has exceeded the threshold as illustrated in FIG. 7 and the operation of performing serial processing when the second elapsed time has exceeded the threshold may be used in combination.

Figure 9:
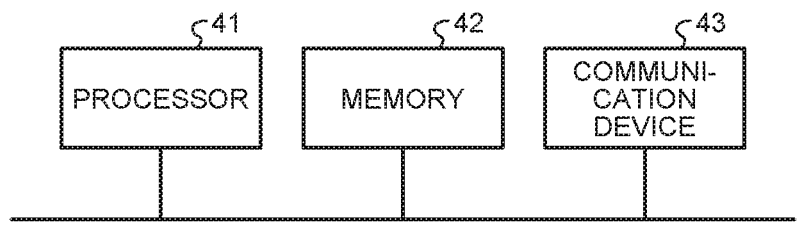
FIG. 9 is a diagram illustrating a hardware configuration of the information processing device illustrated in FIG. 1.

FIG. 9 is a diagram illustrating a hardware configuration of the information processing device 1 illustrated in FIG. 1. The functions of the information processing device 1 can be implemented by using a processor 41, a memory 42, and a communication device 43.

The processor 41 is a central processing unit (CPU), which may also be called a central processor, a processing unit, a computing unit, a microprocessor, a microcomputer, a processor, a digital signal processor (DSP), or the like. The memory 42 is a nonvolatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, a digital versatile disk (DVD), or the like, for example. The communication device 43 is a communication interface with external devices, and may be a wired communication interface or a wireless communication interface.

The respective functions of the first processing units 11, the first intra-OS communication unit 12, the first management unit 13, the first transmission unit 14, the first reception unit 15, and the reception management unit 16 included in the information processing device 1 can be implemented by the processor 41 by executing computer programs stored in the memory 42 on the real-time OS. The processor 41 can communicate with external devices by using the communication device 43 while executing a program. The respective functions of the second processing units 21, the second intra-OS communication unit 22, the second management unit 23, the second transmission unit 24, and the second reception units 25 included in the information processing device 1 can be implemented the processor 41 by executing computer programs stored in the memory 42 on the non-real-time OS.

The hardware configuration of the information processing device 1 is not limited to a specific embodiment. For example, the information processing device 1 may include a plurality of processors 41, or may include a single multi-core processor 41. Alternatively, the real-time OS and the non-real-time OS may operate in a time sharing manner in a single single-core processor 41.

As described above, according to the embodiment of the present invention, the information processing device 1 is capable of adjusting the amount of transmission data to be transmitted at a time between the first processing units 11 that process data on the real-time OS and the second processing units 21 that process data on the non-real-time OS, on the basis of the accumulation amount of transmission data. This increases the efficiency of data transfer between the OSs, and reduces the difference in processing speed between the OSs. Thus, delays in processing between the OSs are reduced, and processing in the information processing device 1 as a whole can be executed in real time.

In addition, the information processing device 1 includes the first management unit 13 and the second management unit 23 that manage the operation timings of application software for the respective OSs. With this configuration, even when one OS stops, the other OS can continue operating. In addition, cooperation of the first management unit 13 and the second management unit 23 enables startup and shutdown of the information processing device 1 to be synchronized, and also enables restart thereof when trouble such as a halt of an OS occurs to be synchronized. As a result, consistent operation of the system as a whole is guaranteed.

In addition, the information processing device 1 is capable of performing a series of processes such as collection, processing, analysis, and diagnosis of industrial data across the OSs. Thus, processes in which weight is given to the real-time characteristics, such as collection of data, are performed on the real-time OS, and more complicated analysis processes, processes in the presence of existing application software, and the like are performed on the non-real-time OS, which achieves a system having both of real-time characteristics and versatility.

In addition, the information processing device 1 includes the real-time OS and the non-real-time OS, and thus have both of real-time characteristics and versatility. This enables processing on data processed in real time, operation of existing application software on the information processing device 1, and cooperative operation with an external device to the information processing device 1 by making application software running on the external device to execute some processes.

The configurations presented in the embodiment above are examples of the present invention, and can be combined with other known technologies or can be partly omitted or modified without departing from the scope of the present invention.

For example, while the first transmission unit 14 and the second transmission unit 24, which perform communication between the OSs, have the functions of the data alignment unit 31 in the embodiment described above, the present invention is not limited to this example. The first intra-OS communication unit 12 and the second intra-OS communication unit 22 may also have the functions of the data alignment unit 31.

REFERENCE SIGNS LIST 1 information processing device; 10 real-time processing unit; 11, 11-1, 11-2 first processing unit; 12 first intra-OS communication unit; 13 first management unit; 14 first transmission unit; 15 first reception unit; 16 reception management unit; 20 non-real-time processing unit; 21, 21-1, 21-2 second processing unit; 22 second intra-OS communication unit; 23 second management unit; 24 second transmission unit; 25, 25-1, 25-2 second reception unit; 31 data alignment unit; 32 transmission processing unit; 41 processor; 42 memory; 43 communication device.

The invention claimed is:

1. An information processor comprising:
a real-time processor including a first processing circuitry to perform first data processing on industrial data relating to operation of manufacturing equipment on a real-time operating system that executes processing within a specified time; and
a non-real-time processor including a second processing circuitry to perform second data processing on the industrial data on a non-real-time operating system, wherein
the non-real-time processor includes a plurality of second reception circuitries to receive, on the non-real-time operating system, first transmission data transmitted from the real-time processor and output the first transmission data to the second processing circuitry,
the real-time processor includes a first transmission circuitry to adjust, on the real-time operating system, a data amount of the first transmission data, that are data obtained by the first data processing and that are to be transmitted to the second processing circuitry, and transmit the first transmission data to the second reception circuitries,
the first transmission circuitry checks an accumulation amount of the first transmission data for each of the second reception circuitries that are destinations at a predetermined check period, and when a plurality of first transmission data are present, performs, for each of the second reception circuitries, batch processing of transmitting the plurality of first transmission data together, and when a plurality of first transmission data are not present, performs, for each of the second reception circuitries, serial processing of transmitting the first transmission data individually,
when the accumulation amount has exceeded a first threshold, the first transmission circuitry performs a process of transmitting an amount of the first transmission data within the first threshold together to the second reception circuitry for which the accumulation amount has exceeded the first threshold, and the first threshold is set on the basis of a data amount of first transmission data that can be processed during one check period, the first transmission data being received from the first transmission circuitry by the second reception circuitry.

2. The information processor according to claim 1, wherein the first transmission circuitry switches between the batch processing and the serial processing on the basis of an elapsed time from previous transmission of the first transmission data.

3. The information processor according to claim 2, wherein the first transmission circuitry performs the serial processing when the elapsed time has exceeded a predetermined time at occurrence of the first transmission data.

4. The information processor according to claim 1, wherein the first transmission circuitry includes a data alignment circuitry to perform, when no corresponding data are present among a plurality of kinds of first transmission data, interpolation to compensate for missing data, discarding of the first transmission data, or time shifting of the first transmission data, and align the first transmission data in association with one another, and the first transmission circuitry adjusts the data amount on the basis of the accumulation amount after the alignment.

5. The information processor according to claim 1, wherein the real-time processor further includes:

a first management circuitry to control operation timing of the first processing circuitry on the real-time operating system; and the non-real-time processor includes a second management circuitry to control operation timing of the second processing circuitry on the non-real-time operating system.

6. The information processor according to claim 1, wherein the non-real-time processor includes a second transmission circuitry to adjust, on the non-real-time operating system, a data amount of second transmission data to be transmitted from the second processing circuitry to the first processing circuitry, and the real-time processor includes a first reception circuitry to receive, on the real-time operating system, the second transmission data from the second transmission circuitry, the number of first reception circuitries being fixed.

7. The information processor according to claim 6, wherein the number of first reception circuitries is one, and the information processor further comprises a reception management circuitry to assign data received by the first reception circuitry to one of the first processing circuitries.

8. The information processor according to claim 7, wherein the first processing circuitries each include a data collection processing circuitry to collect data from an external device, and a notification processing circuitry to provide notification of a diagnosis result after processing and diagnosis of the collected data performed by the first processing circuitries or the second processing circuitry, and the information processor executes a series of processes including processing, on the non-real-time operating system, data collected on the real-time operating system, and thereafter notifying the external device of the diagnosis result by the notification processing circuitry.

* * * * *